US010997421B2

(12) United States Patent
Khosla et al.

(10) Patent No.: US 10,997,421 B2
(45) Date of Patent: May 4, 2021

(54) NEUROMORPHIC SYSTEM FOR REAL-TIME VISUAL ACTIVITY RECOGNITION

(71) Applicant: HRL Laboratories, LLC, Malibu, CA (US)

(72) Inventors: Deepak Khosla, Camarillo, CA (US); Ryan M. Uhlenbrock, Camarillo, CA (US); Yang Chen, Westlake Village, CA (US)

(73) Assignee: HRL Laboratories, LLC, Malibu, CA (US)

( * ) Notice: Subject to any disclaimer, the term of this patent is extended or adjusted under 35 U.S.C. 154(b) by 214 days.

(21) Appl. No.: 15/947,032

(22) Filed: Apr. 6, 2018

(65) Prior Publication Data

US 2018/0300553 A1    Oct. 18, 2018

Related U.S. Application Data

(63) Continuation-in-part of application No. 15/883,822, filed on Jan. 30, 2018.

(Continued)

(51) Int. Cl.
*G06K 9/00* (2006.01)
*G06K 9/62* (2006.01)
(Continued)

(52) U.S. Cl.
CPC ..... *G06K 9/00718* (2013.01); *G06K 9/00744* (2013.01); *G06K 9/00771* (2013.01);
(Continued)

(58) Field of Classification Search
None
See application file for complete search history.

(56) References Cited

U.S. PATENT DOCUMENTS 7,746,378 B2 * 6/2010 Shu .................. G08B 13/19682
                                                    348/143
8,345,984 B2 * 1/2013 Ji .......................... G06N 3/0454
                                                    382/190

(Continued)

FOREIGN PATENT DOCUMENTS

WO    WO2017182225    10/2017

OTHER PUBLICATIONS

Bradski, Gary, and Stephen Grossberg. "Fast-learning VIEWNET architectures for recognizing three-dimensional objects from multiple two-dimensional views." Neural Networks 8.7-8 (1995): 1053-1080. (Year: 1995).*

(Continued)

*Primary Examiner* — Michelle M Entezari
(74) *Attorney, Agent, or Firm* — Tope-McKay & Associates

(57) ABSTRACT

Described is a system for visual activity recognition that includes one or more processors and a memory, the memory being a non-transitory computer-readable medium having executable instructions encoded thereon, such that upon execution of the instructions, the one or more processors perform operations including detecting a set of objects of interest in video data and determining an object classification for each object in the set of objects of interest, the set including at least one object of interest. The one or more processors further perform operations including forming a corresponding activity track for each object in the set of objects of interest by tracking each object across frames. The one or more processors further perform operations including, for each object of interest and using a feature extractor, determining a corresponding feature in the video data. The system may provide a report to a user's cell phone or central monitoring facility.

25 Claims, 13 Drawing Sheets

Related U.S. Application Data

(60) Provisional application No. 62/479,204, filed on Mar. 30, 2017, provisional application No. 62/516,217, filed on Jun. 7, 2017.

(51) Int. Cl.
*G06K 9/46* (2006.01)
*G06N 3/04* (2006.01)
*G06N 3/08* (2006.01)
*G05D 1/02* (2020.01)

(52) U.S. Cl.
CPC ......... *G06K 9/4628* (2013.01); *G06K 9/6271* (2013.01); *G06N 3/04* (2013.01); *G06N 3/0445* (2013.01); *G06N 3/0454* (2013.01); *G06N 3/08* (2013.01); *G05D 1/0202* (2013.01); *G05D 1/0246* (2013.01); *G06K 2009/00738* (2013.01)

(56) References Cited

U.S. PATENT DOCUMENTS

| | | | |
|---|---|---|---|
| 8,532,336 B2* | 9/2013 | Bobbitt | G06K 9/4647 382/103 |
| 8,948,499 B1* | 2/2015 | Medasani | G06K 9/00771 382/155 |
| 9,008,366 B1 | 4/2015 | Kim et al. | |
| 9,147,255 B1 | 9/2015 | Zhang et al. | |
| 9,216,737 B1 | 12/2015 | Zhu et al. | |
| 9,443,320 B1 | 9/2016 | Gaidon | |
| 9,922,425 B2* | 3/2018 | Partis | G06T 7/143 |
| 10,007,850 B2* | 6/2018 | Leung | G06K 9/00771 |
| 10,440,313 B2* | 10/2019 | Dodballapur | G06T 7/254 |
| 2004/0143602 A1* | 7/2004 | Ruiz | G08B 13/122 |
| 2013/0279808 A1 | 10/2013 | Levi | |
| 2015/0063688 A1 | 3/2015 | Bhardwaj | |
| 2015/0186736 A1 | 7/2015 | Han | |
| 2016/0148054 A1 | 5/2016 | Han et al. | |
| 2016/0292522 A1 | 10/2016 | Chen | |
| 2017/0032676 A1 | 2/2017 | Mesmakhosroshahi | |
| 2017/0099200 A1 | 4/2017 | Ellenbogen | |
| 2017/0124415 A1 | 5/2017 | Choi | |
| 2017/0308756 A1* | 10/2017 | Sigal | G06K 9/00335 |
| 2017/0344838 A1 | 11/2017 | Zhou | |
| 2018/0005079 A1 | 1/2018 | Tosic | |
| 2018/0012463 A1* | 1/2018 | Chaudhry | G06T 7/246 |
| 2018/0089542 A1* | 3/2018 | Stoop | G06K 9/6878 |
| 2018/0218515 A1* | 8/2018 | Terekhov | G06K 9/00369 |
| 2018/0232604 A1* | 8/2018 | Seybold | G06K 9/6262 |
| 2018/0253839 A1 | 9/2018 | Zur | |
| 2019/0080176 A1* | 3/2019 | Lan | G06N 3/0454 |
| 2019/0130215 A1 | 5/2019 | Kaestle | |

OTHER PUBLICATIONS

Bradski, G., Carpenter, G. A., & Grossberg, S. (1994). STORE working memory networks for storage and recall of arbitrary temporal sequences. Biological Cybernetics, 71(6), 469-480. (Year: 1994).*

Yao, Li, et al. "Describing videos by exploiting temporal structure." Proceedings of the IEEE international conference on computer vision. 2015. (Year: 2015).*

Gidaris, Spyros, and Nikos Komodakis. "Object detection via a multi-region and semantic segmentation-aware cnn model." Proceedings of the IEEE international conference on computer vision. 2015. (Year: 2015).*

Bhola, Geetanjali, et al. "Real-time Pedestrian Tracking based on Deep Features." 2020 4th International Conference on Intelligent Computing and Control Systems (ICICCS). IEEE, 2020. (Year: 2020).*

Patalas-Maliszewska, Justyna, and Daniel Halikowski. "A Deep Learning-Based Model for the Automated Assessment of the Activity of a Single Worker." Sensors 20.9 (2020): 2571. (Year: 2020).*

Yao, Li, and Ying Qian. "Novel activities detection algorithm in extended videos." 2019 IEEE Winter Applications of Computer Vision Workshops (WACVW). IEEE, 2019. (Year: 2019).*

Yeung, S., Russakovsky, O., Jin, N., Andriluka, M., Mori, G., & Fei-Fei, L. (2018). Every moment counts: Dense detailed labeling of actions in complex videos. International Journal of Computer Vision, 126(2-4), 375-389. (Year: 2018).*

Papakostas, M., Giannakopoulos, T., Makedon, F., & Karkaletsis, V. (Jan. 2016). Short-term recognition of human activities using convolutional neural networks. In 2016 12th international conference on signal-image technology & internet-based systems (SITIS) (pp. 302-307). IEEE. (Year: 2016).*

Pobar, Miran, and Marina Ivasic-Kos. "Mask R-CNN and Optical flow based method for detection and marking of handball actions." 2018 11th International Congress on Image and Signal Processing, BioMedical Engineering and Informatics (CISP-BMEI). IEEE, 2018. (Year: 2018).*

Girish, Deeptha, Vineeta Singh, and Anca Ralescu. "Understanding Action Recognition in Still Images." Proceedings of the IEEE/CVF Conference on Computer Vision and Pattern Recognition Workshops. 2020. (Year: 2020).*

Tekin, B., Rozantsev, A., Lepetit, V., & Fua, P. (2016). Direct prediction of 3d body poses from motion compensated sequences. In Proceedings of the IEEE Conference on Computer Vision and Pattern Recognition (pp. 991-1000). (Year: 2016).*

Notification of Transmittal of International Search Report and the Written Opinion of the International Searching Authority for PCT/US2018/026432; dated Mar. 29, 2019.

International Search Report of the International Searching Authority for PCT/US2018/026432; dated Mar. 29, 2019.

Written Opinion of the International Searching Authority for PCT/US2018/026432; dated Mar. 29, 2019.

Donahue, et al., "Long-term Recurrent Convolutional Networks for Visual Recognition and Description," In The IEEE Conference on Computer Vision and Pattern Recognition (CVPR), 2015, pp. 2625-2634.

Karpathy, et al., "Large-scale Video Classification with Convolutional Neural Networks," The IEEE Conference on Computer Vision and Pattern Recognition (CVPR), 2014, pp. 1725-1732.

Simonyan, et al., "Two-Stream Convolutional Networks for Action Recognition in Videos," In: Proceeding NIPS'14 Proceeding of the 27th International Conference on Neural Information Processing Systems (NIPS). Dec. 2014, pp. 1-9.

Karpathy, A. et al., "Large-Scale Video Classification With Convolutional Neural Networks" (2014), pp. 1725-1732.

Simonyan, K. et al., "Two-Stream Convolutional Networks for Action Recognition in Videos" (2014), pp. 1-9.

Vrigkas, M. et al., "A Review of Human Activity Recognition Methods," Frontier in Robotics and AI, 2015, pp. 1-28.

Donahue, J. et al., "Long-term Recurrent Convolutional Networks for Visual Recognition and Description," CVPR 2015, pp. 2625-2634.

Khosla, D. "A Neuromorphic System for Video Object Recognition, Frontiers in Computational Neuroscience," vol. 8: Article 147 (2014), pp. 1-12.

Rothe, R. et al. "Non-maximum Suppression for Object Detection by Passing Messages Between Windows" Computer Vision— ACCV 2014. Lecture Notes in Computer Science, vol. 9003 (2015), pp. 290-306.

Kuhn, H. "The Hungarian Method for the assignment problem" Naval Research Logistics Quarterly, 2: pp. 83-97, (1955).

Munkres, J. "Algorithms for the Assignment and Transportation Problems" Journal of the Society for Industrial and Applied Mathematics, 5(1): pp. 32-38, (1957).

Gershgorn, D. (Jul. 26, 2017) "The data that transformed AI research—and possibly the world" Retrieved from https://qz.com/1034972/the-data-that-changed-the-direction-of-ai-research-and-possibly-the-world/ , pp. 1-13, downloaded May 21, 2018.

Olah, C. (Aug. 27, 2015) "Understanding LSTM Networks" Colah's Blog. Retried from http://colah.github.io/posts/2015-08-Understanding-LSTMs/#fn1, pp. 1-16, downloaded May 21, 2018.

(56) References Cited

OTHER PUBLICATIONS

Cortes, C. et al. "Support-vector networks" Machine Learning. 20 (3): pp. 273-297 (1995).
P. Luo, X. Zeng, X. Wang, and X. Tang. Switchable deep network for pedestrian detection. CVPR, 2014, pp. 893-906.
W. Ouyang and X. Wang. Joint deep learning for pedestrian detection. ICCV, 2013, pp. 2056-2063.
A. Angelova, A. Krizhevsky, V. Vanhoucke, A. Ogale, D. Ferguson, Real-Time Pedestrian Detection With Deep Network Cascades, British Machine Vision Conference (BMVC), 2015, pp. 1-12.
Notification of the International Preliminary Report on Patentability Chapter I for PCT/US2018/026432; dated Dec. 19, 2019.
The International Preliminary Report on Patentability Chapter I for PCT/US2018/026432; dated Dec. 19, 2019.
Office Action 1 for U.S. Appl. No. 15/883,822, dated Oct. 9, 2019.
Dollar, P., et al., "Integral channel features," In: British Machine Vision Conference, vol. 2, 2009.
Chen X., et al., "Pedestrian detection with deep convolutional neural network," in Asian Conference on Computer Vision, Nov. 1, 2014, pp. 354-365, Springer, Cham. (Year 2014).
Xu Y., et al., "Online discriminative structured output SVM learning for multi-target tracking," IEEE Signal Processing Letters, Jan. 9, 2014; 21(2): 190-4. (Year: 2014).
Verma, A., et al., 2015, "Pedestrian detection via mixture of CNN experts and thresholded aggregated channel features;" In Proceedings of the IEEE International Conference on Computer Vision Workshops pp. 163-171, (Year: 2015).
Brauer H., et al, "Robust false positive detection for real-time multi-target tracking," International Conference on Image and Signal Processing Jun. 30, 2014, pp. 450-459, Springer, Cham. (Year: 2014).
Ju J., et al., "Online multi-person tracking with two-stage data association and online appearance model learning," IET Computer Vision, Jul. 18, 2016; 11(1):87-95, (Year: 2016).
Response to office Action 1 for U.S. Appl. No. 15/883,822, dated Feb. 6, 2020.
Office Action 2 for U.S. Appl. No. 15/883,822, dated Mar. 6, 2020.
Dorin Comaniciu, et al., "Kernel-Based Object Tracking" IEEE Transactions on Pattern Analysis and Machine Intelligence, vol. 25, No. 5, May 2003, pp. 564-577.
Response to Office Action 2 for U.S. Appl. No. 15/883,822, dated Jun. 3, 2020.
Office Action 3 for U.S. Appl. No. 15/883,822, dated Jun. 15, 2020.
Response to Office Action 3 for U.S. Appl. No. 15/883,822, dated Sep. 14, 2020.
Office Action 4 for U.S. Appl. No. 15/883,822, dated Oct. 19, 2020.

* cited by examiner

| METHOD | CLASSIFICATION ACCURACY |
|---|---|
| 1. CNN ONLY | 90.8% |
| 2. CNN+RNN AVERAGED | 88.6% |
| 3. CNN+RNN CONCATENATED | 90.9% |
| 4. CNN+RNN LAST FRAME | 92.8% |

FIG. 5

|  | OPEN/CLOSE TRUNK | IN/OUT VEHICLE | IN/OUT FACILITY | ACCURACY % |
|---|---|---|---|---|
| OPEN/CLOSE TRUNK | 32 | 15 | 0 | 68 % |
| IN/OUT VEHICLE | 2 | 38 | 0 | 95 % |
| IN/OUT FACILITY | 0 | 0 | 0 | na |

FIG. 9

|  |  |  |  |  |  |  |  |  |  |  |  |  |  |  |
|---|---|---|---|---|---|---|---|---|---|---|---|---|---|---|
| MAN | [872 | 71 | 95 | 12 | 19 | 54 | 15 | 10 | 61 | 6 | 18 | 11 | 0 | ] 70.096463% |
| MAN_W_2X4 | [10 | 135 | 0 | 17 | 6 | 0 | 6 | 9 | 21 | 0 | 0 | 2 | 0 | ] 65.533981% |
| MAN_W_AK47 | [20 | 28 | 150 | 109 | 13 | 18 | 13 | 26 | 60 | 7 | 6 | 33 | 0 | ] 31.055901% |
| MAN_W_BINOCS | [0 | 0 | 0 | 0 | 0 | 0 | 0 | 0 | 0 | 0 | 0 | 0 | 0 | ] NA |
| MAN_W_CAMERA | [0 | 0 | 0 | 0 | 0 | 0 | 0 | 0 | 0 | 0 | 0 | 0 | 0 | ] NA |
| MAN_W_CELLPHN | [26 | 9 | 5 | 3 | 24 | 677 | 13 | 223 | 16 | 56 | 11 | 55 | 0 | ] 68.554562% |
| MAN_W_FLASHLT | [11 | 8 | 24 | 44 | 6 | 0 | 88 | 14 | 0 | 0 | 26 | 164 | 0 | ] 22.857143% |
| MAN_W_RAKE | [20 | 11 | 0 | 18 | 205 | 4 | 18 | 162 | 8 | 1 | 6 | 0 | 0 | ] 35.761589% |
| MAN_W_RPG | [8 | 1 | 0 | 3 | 4 | 0 | 8 | 0 | 7 | 2 | 2 | 0 | 0 | ] 20.000000% |
| MAN_W_SHOVEL | [79 | 13 | 2 | 17 | 26 | 25 | 11 | 1 | 59 | 75 | 6 | 14 | 0 | ] 22.865854% |
| MAN_W_SUITCASE | [5 | 5 | 9 | 1 | 39 | 18 | 9 | 13 | 0 | 11 | 827 | 76 | 0 | ] 81.638697% |
| MAN_W_WATERBTL | [3 | 1 | 0 | 2 | 0 | 8 | 42 | 0 | 4 | 2 | 5 | 0 | 0 | ] 0.000000% |
| VEHICLE | [0 | 0 | 0 | 0 | 0 | 0 | 0 | 0 | 0 | 0 | 1 | 0 | 70 | ] 98.591549% |

Global: 56.690727%

FIG. 10

# NEUROMORPHIC SYSTEM FOR REAL-TIME VISUAL ACTIVITY RECOGNITION

CROSS-REFERENCE TO RELATED APPLICATIONS

This is a Continuation-in-Part application of U.S. patent application Ser. No. 15/883,822, filed on Jan. 30, 2018, which is a non-provisional application of U.S. Provisional Application No. 62/479,204, filed on Mar. 30, 2017, the entirety of which are hereby incorporated by reference.

This application ALSO claims the benefit of and is a non-provisional patent application of U.S. provisional application no. 62/516,217, filed on Jun. 7, 2017, the entirety of which is hereby incorporated by reference.

GOVERNMENT RIGHTS

This invention was made with government support under U.S. Government Contract Number N00014-15-C-0091 NEMESIS awarded by the ONR. The government has certain rights in the invention.

BACKGROUND OF INVENTION

(1) Field of Invention

The present invention relates to visual activity recognition and, more specifically, to a neuromorphic system for real-time visual activity recognition.

(2) Description of Related Art

Automated pattern recognition, and more specifically, visual image and/or activity recognition, have applications in a wide array of fields including navigation, manufacturing, surveillance, medicine, and other areas. Some conventional methods for attempting to recognize activity include those disclosed in Large-Scale Video Classification With Convolutional Neural Networks (See the List of Incorporated Literature References, Literature Reference No. 1), and Two-Stream Convolutional Networks For Action Recognition In Videos (see Literature Reference No. 2). Other conventional methods include those disclosed in A Review of Human Activity Recognition Methods (see Literature Reference No. 3), and Long-term Recurrent Convolutional Networks for Visual Recognition and Description (see Literature Reference No. 4).

Each of these methods, however, is limited to only addressing the activity classification problem: they assume the input is an activity video clip that is centered on and contains just the activity of interest. They are not applicable to Intelligence, Surveillance, and Reconnaissance (ISR) type detect-and-classify applications where the scene may contain multiple objects, clutter, and the actual activity of interest occupies a small region of the video. In these classes of problems, the objects of interest first need to be detected/classified and tracked before activity classification can be carried out. In addition, none of these prior art systems are capable of being applied to multiple different use cases, such as aerial, ground, stationary, or moving platforms.

Thus, a continuing need exists for a system for visual activity recognition that addresses the above limitations.

SUMMARY OF INVENTION

This disclosure provides a system for visual activity recognition. In various embodiments, the system includes one or more processors and a memory. The memory is a non-transitory computer-readable medium having executable instructions encoded thereon, such that upon execution of the instructions, the one or more processors perform operations that include detecting a set of objects of interest in video data and determining an object classification for each object in the set of objects of interest, the set comprising at least one object of interest; forming a corresponding activity track for each object in the set of objects of interest by tracking each object across frames; for each object of interest and using a feature extractor, determining a corresponding feature in the video data by performing feature extraction based on the corresponding activity track, the feature extractor comprising a convolutional neural network; and for each object of interest, based on the output of the feature extractor, determining a corresponding activity classification for each object of interest.

In another aspect, the one or more processors further perform operations of controlling a device based on at least one of the corresponding activity classifications.

In yet another aspect, controlling the device includes using a machine to send at least one of a visual, audio, or electronic alert regarding the activity classification.

In yet another aspect, controlling the device includes causing a ground-based or aerial vehicle to initiate a physical action.

In yet another aspect, the feature extractor includes a recurrent neural network, and the one or more processors further perform operations of, for each object of interest and using the recurrent neural network, extracting a corresponding temporal sequence feature based on at least one of the corresponding activity track and the corresponding feature.

In yet another aspect, the recurrent neural network uses Long Short-Term Memory as a temporal component.

In yet another aspect, the convolutional neural network includes at least five layers of convolution-rectification-pooling.

In yet another aspect, the convolutional neural network further includes at least two fully-connected layers.

In yet another aspect, the activity classification includes at least one of a probability and a confidence score.

In yet another aspect, the set of objects of interest includes multiple objects of interest, and the convolutional neural network, the recurrent neural network, and the activity classifier operate in parallel on multiple corresponding activity tracks.

In yet another aspect, the activity classification includes at least one of a probability and a confidence score.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where:

FIG. 5 is a table showing percentages of correct classifications for various methods, according to some embodiments;

FIG. 9 is a table illustrating percentage accuracy of classification for various scenarios;

FIG. 10 is a table illustrating results from testing of a full activity recognition pipeline, according to some embodiments;

DETAILED DESCRIPTION

Figure 1:
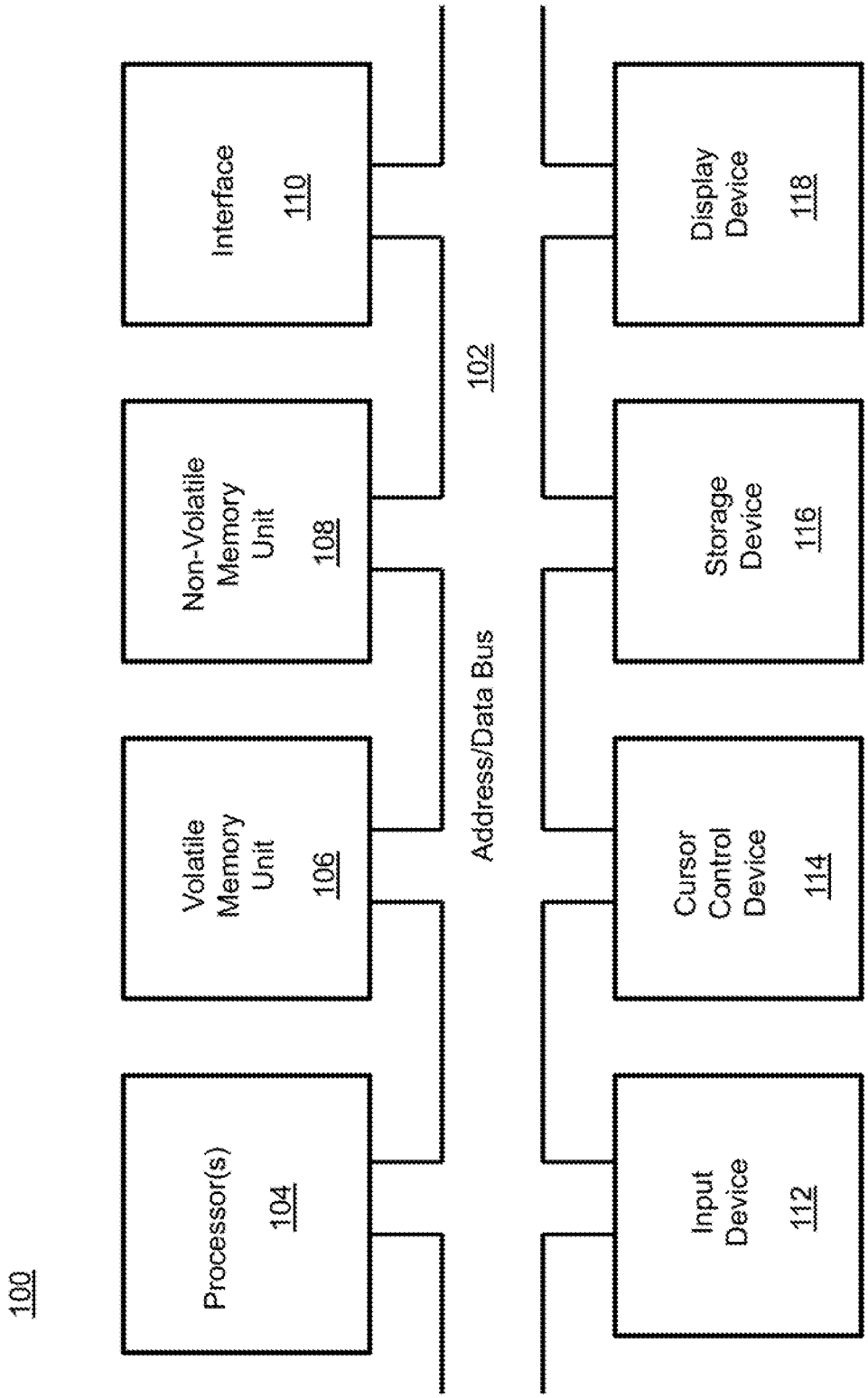
FIG. 1 is a block diagram depicting the components of a system according to various embodiments of the present invention.

The present invention relates to visual activity recognition and, more specifically, to a neuromorphic system for real-time visual activity recognition.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of incorporated literature references is provided as a central resource for the reader. Next, a description of the various principal aspects of the present invention is provided. Subsequently, an introduction provides the reader with a general understanding of the present invention. Finally, specific details of various embodiment of the present invention are provided to give an understanding of the specific aspects.

(1) List of Incorporated Literature References

The following references are cited throughout this application. For clarity and convenience, the references are listed herein as a central resource for the reader. The following references are hereby incorporated by reference as though fully set forth herein. The references are cited in the application by referring to the corresponding literature reference number, as follows:

1. Karpathy, A. et al., "Large-Scale Video Classification With Convolutional Neural Networks" (2014).
2. Simonyan, K. et al., "Two-Stream Convolutional Networks For Action Recognition In Videos" (2014).
3. Vrigkas, M. et al., "A Review of Human Activity Recognition Methods," Frontier in Robotics and AI, 2015.
4. Donahue, J. et al., "Long-term Recurrent Convolutional Networks for Visual Recognition and Description," CVPR 2015.
5. Kim, K. et al., "Bio-Inspired Method Of Ground Object Cueing In Airborne Motion Imagery," U.S. Pat. No. 9,008,366.
6. Zhang, L. "Rapid Object Detection By Combining Structural Information From Image Segmentation With Bio-Inspired Attentional Mechanisms," U.S. Pat. No. 9,147,255.
7. Khosla, D. "A Neuromorphic System for Video Object Recognition, Frontiers in Computational Neuroscience," 8: 147 (2014).
8. U.S. patent application Ser. No. 15/883,822, "Real-Time Object Recognition Using Cascaded Features, Deep Learning And Multi-Target Tracking" filed on Jan. 30, 2018.
9. Rothe, R. et al. "Non-maximum Suppression for Object Detection by Passing Messages Between Windows" Computer Vision-ACCV 2014. Lecture Notes in Computer Science, vol. 9003 (2015).
10. Kuhn, H. "The Hungarian Method for the assignment problem" Naval Research Logistics Quarterly, 2: 83-97 (1955).
11. Munkres, J. "Algorithms for the Assignment and Transportation Problems" Journal of the Society for Industrial and Applied Mathematics, 5(1):32-38, (1957).
12. Gershgorn, D. (2017, Jul. 26) "The data that transformed AI research—and possibly the world" Retrieved from https://qz.com/1034972/the-data-that-changed-the-direction-of-ai-research-and-possibly-the-world/.

13. Olah, C. (2015, Aug. 27) "Understanding LSTM Networks" *Colah's Blog*. Retried from http://colah.github.io/posts/2015-08-Understanding-LSTMs/#fnl.
14. Cortes, C. et al. "Support-vector networks" Machine Learning. 20 (3):273-297 (1995).
15. Kalal, Z. (2011) OpenTLD. Retrieved from https://github.com/zk00006/OpenTLD.
16. He, Y. (2016, Jan. 24) mean-shift-tracking. Retrieved from https://github.com/HeYijia/mean-shift-tracking.

(2) Principal Aspects

Various embodiments of the invention include three "principal" aspects. The first is a system for visual activity recognition and, more specifically, to a neuromorphic system for real-time visual activity recognition. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
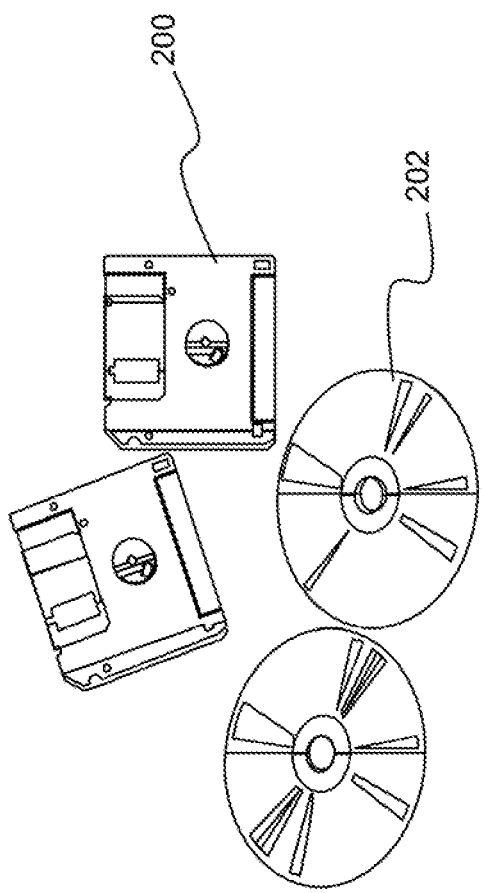
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Introduction

This disclosure describes a novel real-time neuromorphic method and system for activity recognition such as in streaming or recorded videos from static and/or moving platforms. For some embodiments, a novel aspect of some systems involves the specific use of, implementation of, and integrating of five modules: object detection, tracking, convolutional neural network image feature extractor, recurrent neural network sequence feature extractor, and an activity classifier. For some embodiments, the system and method provide real-time visual processing even on small, low power, low cost platforms such as Unmanned Aerial Vehicles (UAVs) and Unmanned Ground Vehicles (UGVs). This approach is also amendable for implementation on emerging spiking neuromorphic hardware.

Some other example applications may include navigation, manufacturing, medical technology, Intelligence, Surveillance, and Reconnaissance (ISR), border security, autonomous UAV and UGV, mission safety, human activity detection, threat detection, distributed mobile operations, etc. Further details regarding the system and various embodiments are provided below.

(4) Specific Details of Various Embodiments (4.1) System

Figure 3:
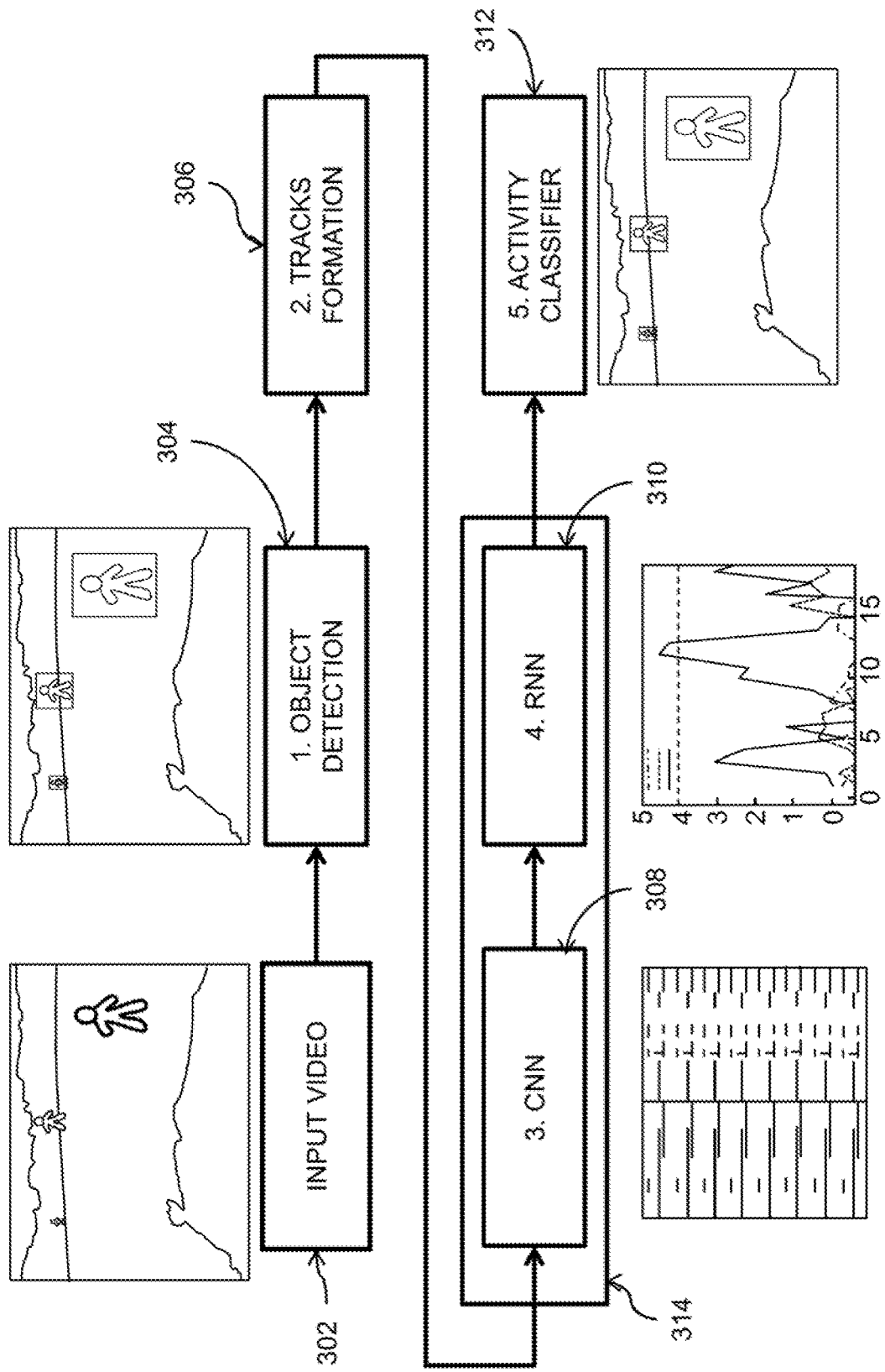
FIG. 3 is a block diagram for real-time activity recognition according to some embodiments.

FIG. 3 is a block diagram of a system 300 for real-time activity recognition according to some embodiments. In some embodiments, the system performs real-time activity recognition in streaming or recorded videos 302 from static or moving platforms. In various embodiments, the system integrates one or more of five modules: object detection 304, tracks formation 306 (e.g., tracking), a convolutional neural network image feature extractor 308, a recurrent neural network sequence feature extractor 310, and a final activity classifier 312. In various embodiments, systems and methods covered by this disclosure may use some, parts of, or all of the functions performed by the modules above. Furthermore, more, fewer, or no modules may be used to perform the operations described in this disclosure. In various embodiments, the system identifies all objects of interest, tracks them, and handles processing for all activity tracks to give activity classification of all objects of interest. For example, in various embodiments, if 1, 5, 10 or more objects of interest are present, the system will detect, track, and give activity classification for all the objects of interest.

(4.2) Object Detection

The object detection 304 module finds objects of interest in the input video 302 and outputs their bounding box location and class label. The input video may be prerecorded, or may be acquired real time via a camera or other sensor. The input video may include video data comprising multiple sequentially recorded image frames.

For example, if the objective is human activity recognition, then this module detects and classifies all human or "MAN" objects (e.g., persons) in the incoming video 302. If the objective is vehicle activity recognition, then this module detects and classifies all "VEHICLE" objects in the incoming video. In other words, object detection 304 detects a set of objects of interest in video data and determines an object classification for each object of interest in the set of objects of interest. The set of objects may include all objects of interest in the video, which may include quantities and/or ranges of quantities such as 1-3, 1-5, 1-10, or more objects of interest.

It should be understood that any suitable object detector may be implemented for this object detection module 304, non-limiting examples of which include those as described in Literature Reference Nos. 5, 6, 7, and 8 (see the List of Incorporated Literature References). In some embodiments, for an aerial platform, the system includes object detection 304, tracks formation 306, and CNN 308. In some embodiments, for a ground platform, the system also includes RNN 310 in addition to the other modules. Other embodiments are possible. In some embodiments, the detected objects of interest serve as seeds for the next module (e.g., tracks formation 306), as explained in greater detail below.

(4.3) Tracks Formation

In the tracks formation 306 module, activity tracks are formed by tracking each of object detection 304's detected objects across frames, and forming a corresponding activity track for each detected object. The system uses a multi-target Kalman filter tracker. In other embodiments, alternate trackers may include OpenTLD or Mean Shift Tracking (see Literature Reference Nos. 15 and 16). The system further performs customized non-maximum suppression (see Literature Reference No. 9), and uses heuristics to identify and eliminate false alarm tracks. The Kalman filter is used to predict the centroid of each track in the current frame, and update a bounding box of a corresponding tracked object accordingly. In some embodiments, a track is a frame-number indexed list of bounding box positions (centered around detected object(s) whose position can change from frame to frame as the object moves) with a unique ID. In some embodiments, the current frame is the frame that is being processed whether it is a recorded video or a streaming live video. In some embodiments, "update" refers to determining where to draw the defining boundaries of the bounding box. Based on this update, in some embodiments, the whole bounding box should be moved to be centered on the predicted centroid.

The width and height of the bounding box in previous frame is used as the current prediction of the size. The cost is computed using bounding box overlap ratio/between the predicted bounding box and the classified bounding box. In other words, the cost is a ratio (e.g., a number between 0-1) computed by determining the area of overlap between two rectangles. The Munkres' version of the Hungarian algorithm is used to compute an assignment which minimizes the total cost (see Literature Reference Nos. 10 and 11). In some embodiments, sporadic detections of moving trees, shadows, etc. are removed by only considering tracks with a minimum duration of T seconds (e.g., T is nominally 2 seconds). For some embodiments, the output of the tracks formation 306 module are persistent object tracks that have a minimum duration of T seconds. For example, if a person is carrying a gun in the video and is visible for 5 seconds, tracks formation 306 will output a track of the tracked object (e.g., the gun, the person with the gun, part of the gun such as the gun barrel, etc.) with a unique track number during those 5 seconds.

(4.4) Convolutional Neural Network Feature Extraction

The Feature Extractor 314, which includes a Convolutional Neural Network (CNN 308) module, receives the activity tracks (e.g., persistent tracks or other tracks) as an input from tracks formation 306, and based on each track, automatically learns what intermediate features are most useful (e.g., determines a corresponding feature for each object of interest based on the corresponding activity track) from raw image information within each track bounding box. In some embodiments, no explicit features are extracted. In some embodiments, lower layers of the CNN may learn edge or orientation features and upper layers of the CNN may learn higher-level shape or color information. In some embodiments, the values at the nodes of the various CNN layers are the features. For example, if the last layer of the CNN has 4096 nodes, the feature vector may be of size 4096.

Track bounding boxes may be enlarged by X % (typically 20%) before feature extraction to help with jitter in the underlying detection bounding boxes. In some embodiments, the bounding boxes may be enlarged by between 5% and 40%, although smaller and lower ranges may be possible. In one embodiment, the structure of the CNN 308 in the model is based on AlexNet (see Literature Reference No. 12) and has 5 layers of convolution-rectification-pooling followed by 2 fully-connected layers. In an embodiment, the dimensionality of the CNN 308 output is 4096 features for each frame of the track. In a different embodiment, the system uses the 5-layer custom-designed and trained CNN 308 of Literature Reference No. 8.

(4.5) Recurrent Neural Network Activity Classifier

In some embodiments, the Feature Extractor 314 not only includes CNN 308, but also a Recurrent Neural Network (RNN 310) that extracts temporal sequence features based on the outputs from CNN 308 (e.g., a CNN feature). CNN 308 encodes features per frame, and the RNN 310 concatenates features from multiple frames (i.e., a temporal sequence). In other embodiments, the RNN 310 is not part of the system.

Because activities may have variable time gap between motion (e.g., person entering a building slowly vs. quickly), the Long Short-Term Memory (LSTM) network was used as the temporal component for the RNN 310 (see Literature Reference No. 13). Multiple types of RNN exist, including fully recurrent, recursive, Hopfield, bidirectional associative memory, and others, and other temporal components may be used in different embodiments.

In an embodiment, the LSTM RNN 310 takes as input the 4096-dimensional feature vector from the CNN 308. The sequence of these features over N frames, typically N=16 frames, updates the RNN's internal state at each frame. In some embodiments, the 256-dimensional internal state of the RNN 310 at the end of the N frame sequence is used as the output of the RNN 310 stage, which is the input to a final layer classifier (e.g., activity classifier 312).

(4.6) Activity Classifier

In some embodiments, the system includes the activity classifier 312, which receives the output from Feature Extractor 314, which may be the output from tracks formation 306 (not shown), from CNN 308 (e.g., when RNN 310 is not part of the system, also not shown), or from RNN 310. Based on the output of one or more of tracks formation 306 (e.g., an activity track), CNN 308 (e.g., a feature), and RNN 310 (e.g. a temporal feature), the activity classifier 312 determines an activity classification for the object of interest. In various embodiments, the activity classifier 312 receives inputs from RNN 310 if used, and otherwise from the CNN 308 if the RNN 310 was not used. In some embodiments, the activity classifier 312 is configured to send alerts and tweets comprising the activity classification, time, and image or video to a user's cell phone or a central monitoring station.

Assuming there are K activities to classify, a final fully-connected layer (e.g., activity classifier 312) with K outputs gives the final class probability (e.g., the last layer values are the activity classification results). In various embodiments, values are typically between 0 and 1, and a high score for an activity type indicates a high confidence for that activity type. In a fully connected layer, according to some embodiments, all nodes are connected to all nodes of the previous layer. Alternatively, the activity classifier 312 may be a Support Vector Machine (SVM)(e.g., a support vector network) classifier with K outputs, and the RNN features from RNN 310 can be sent to the SVM (see Literature Reference No. 14). In various embodiments, the SVM is a supervised learning model with one or more associated learning algorithms that analyze data used for classification and/or regression analysis. Some algorithms for finding the SVM classifier include sub-gradient descent and coordinate descent.

The final output is a probability or confidence score (e.g., 75%, or a range such as from 0 to 1) for each of the K classes. In some embodiments where the system is configured to be limited to recognizing certain types of activity, no softmax may be used, and instead a threshold is placed on the output response of the K output nodes to determine when an activity of interest is detected. Other activities, e.g. a person simply walking, should have no output above the threshold and receive effectively a label of "no relevant activity." In some embodiments, softmax refers to normalizing the node values so they sum to 1, and the highest value then becomes the declared activity. In winner take all embodiments, the activity with the highest confidence is the activity label of that track. In other words, while each node in the final layer may represent an activity, and the methods describe above are used to determine the final output based on those node values (e.g., 80% person digging, 15% person standing, 5% person aiming a gun).

In some embodiments, the Feature Extractor 314 (e.g., the CNN 308 and/or RNN 310), and activity classifier 312 modules are run in parallel for each track from the tracks formation 306 module. In other words the Feature Extractor 314 (e.g., which includes the CNN 308 and/or RNN 310), and activity classifier 312 may operate sequentially based on the activity tracks and the output of the previously operating modules. In some embodiments, every track from tracks formation 306 goes through its own 308-310-312 or 308-312 processing that is always sequential (per track). Since there can be several tracks in a video, they all have their own independent processing pipeline 308-310-312 or 308-312 and generate independent activity classification results. "Run in parallel" here means the system can process multiple tracks simultaneously (in parallel) in various embodiments.

Figure 4:
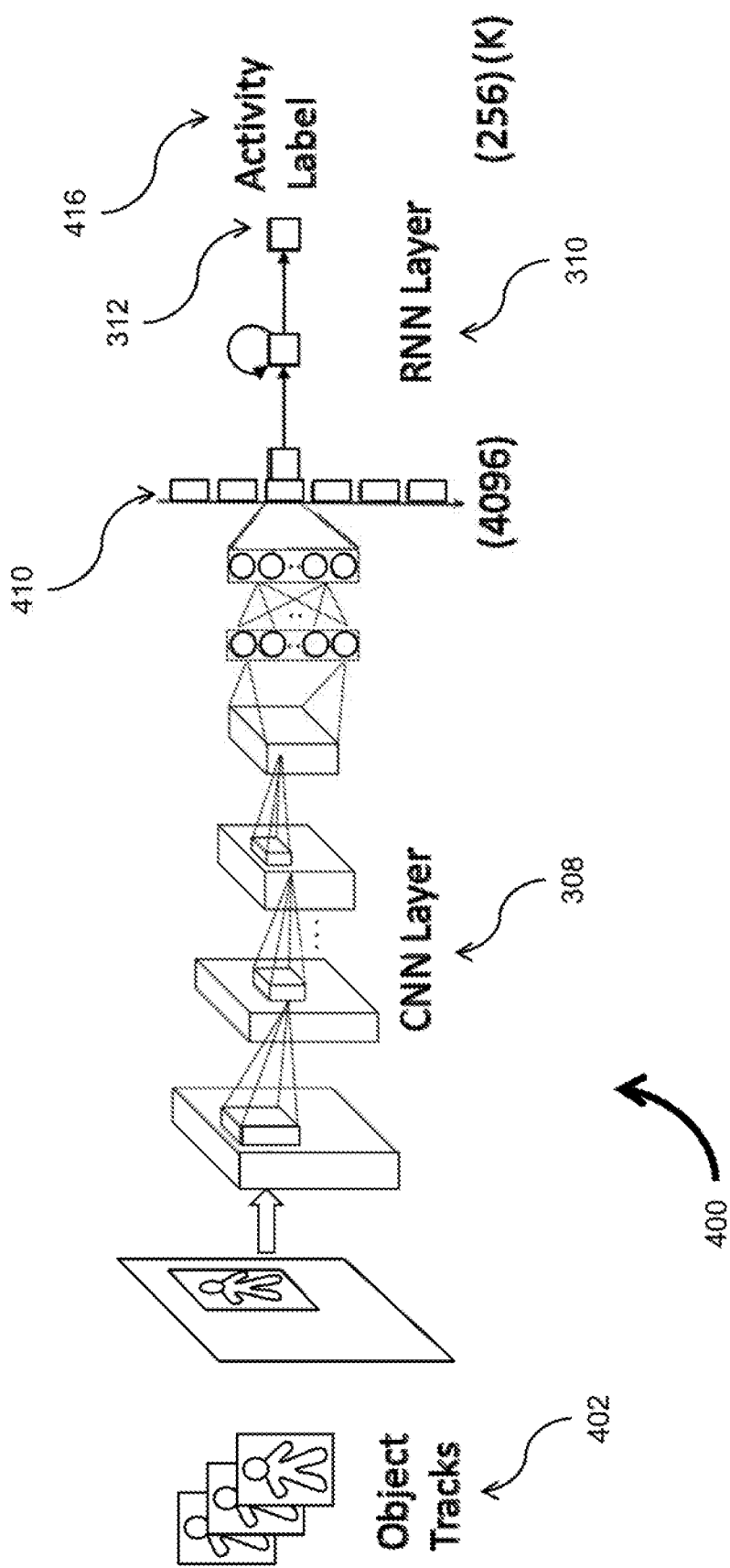
FIG. 4 is a block diagram illustrating additional details for real time activity recognition, according to some embodiments.

For some embodiments, FIG. 4 shows more details of the Feature Extractor 314, CNN 308, RNN 310, and activity classifier 312 modules. FIG. 4 includes representations of an activity classification subsystem 400 that includes CNN 308, RNN 310, and activity classifier 312. The subsystem 400 receives the object tracks 402 and outputs an activity label 416 (e.g., an activity classification). Layer 410 represents the last layer of CNN 308, and in some embodiments, has 4096 nodes (e.g., features).

(4.7) Reduction to Practice

An embodiment has been implemented and tested on video from both aerial and ground platforms. The software and demonstration system for testing ran under Ubuntu Linux 14.04 and used an NVIDIA GPU to function. In test runs, it achieved approximately 10 frames per second (FPS) near real-time throughput on a Dell Alienware laptop with NVIDIA GTX 980M GPU and a quad-core Core i7 CPU@2.7 GHz.

(4.7.1) Aerial Platform (A) VIRAT Dataset

Embodiments were downloaded and evaluated on the Video and Image Retrieval and Analysis Tool (VIRAT) dataset (http://www.viratdata.org/). This dataset is designed to be realistic, natural and challenging for video surveillance domains in terms of its resolution, background clutter, diversity in scenes, and human activity/event categories than existing action recognition datasets. A subset of the dataset contains several HD videos of people performing various everyday activities. The ground truth annotation specifies the type of activity as well as bounding box and temporal range for activities in each video. There are 12 classes of activities annotated. For testing, three pairs of similar activities were combined to pose as a K=3-class activity classification problem: Open/Close Trunk, In/Out Vehicle, and In/Out Facility.

The implemented evaluation focused on activity classification only (i.e., CNN 308, RNN 310, and activity classifier 312 modules). Four different methods were evaluated using ground-truth based video clips (16 evenly spaced frames from each activity and rescaling the images to 360×360 pixels). The CNN 308-RNN 310 modules were used as a 256-dimensional feature extractor and trained a new SVM last layer classifier (e.g., activity classifier 1) for K=3 activities. The SVMs were trained on either the CNN features averaged across the 16 frames, RNN features averaged across the 16 frames, RNN features concatenated across the 16 frames, or RNN features selected from the last frame. The performance was evaluated with cross-validation using a split of 80% training and 20% testing. The table of FIG. 5 shows the percentages of correct classifications with these four methods, and FIG. 6 shows an example in/out facility classification image.

Figure 6:
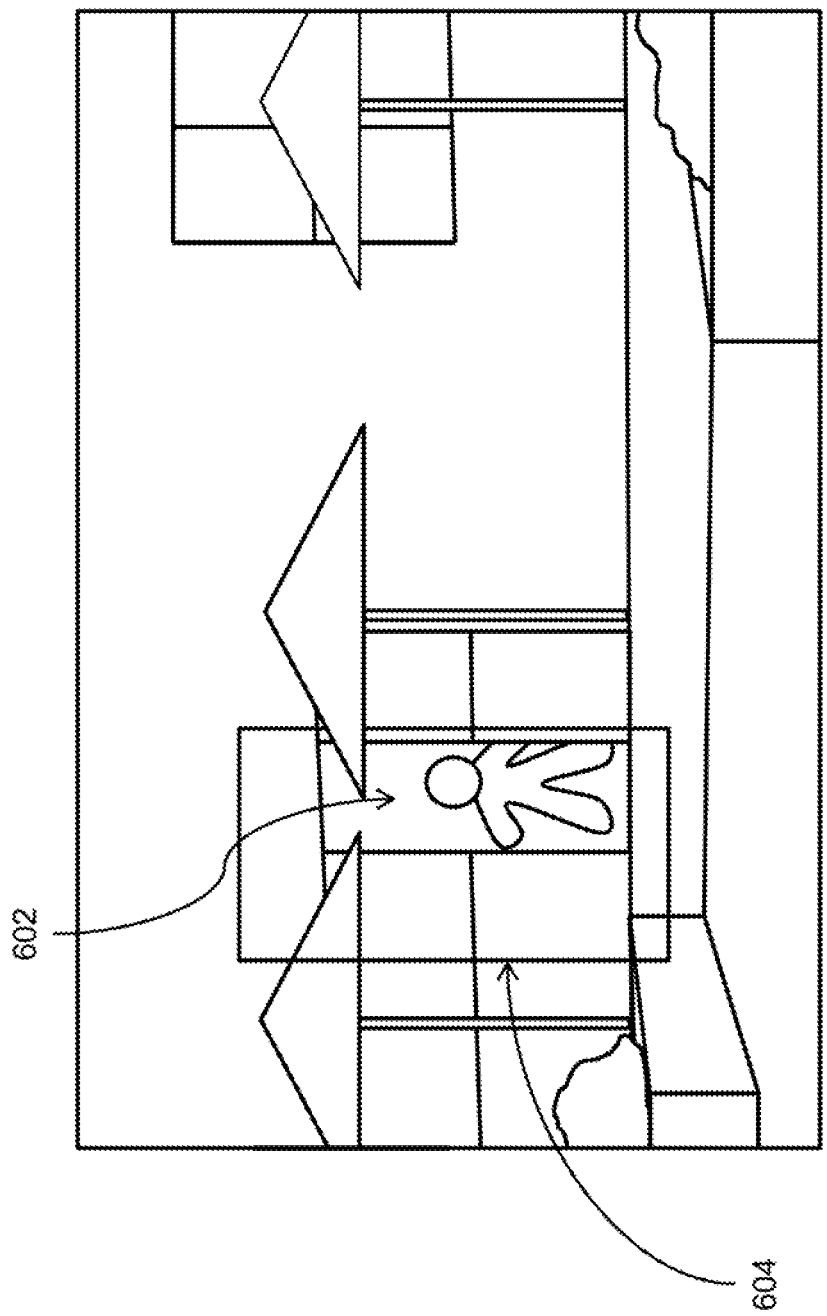
FIG. 6 is an illustration of an example image for in/out facility activity classification, according to some embodiments.

FIG. 6 includes image 602 of a person getting in or out of a facility, and a representation of a bounding box 604.

(B) Internal Dataset

Activity videos were also collected and used to test the generalization performance of some embodiments of the activity recognition classifiers. The data was collected from two pan-tilt-zoom surveillance cameras mounted to buildings looking down to a parking lot. About 45 minutes of video were recorded from each camera while people went through the parking lot, specifically performing the activities of opening/closing a trunk and getting in/out of a vehicle (see FIGS. 7 and 8 for example video images).

Figure 7:
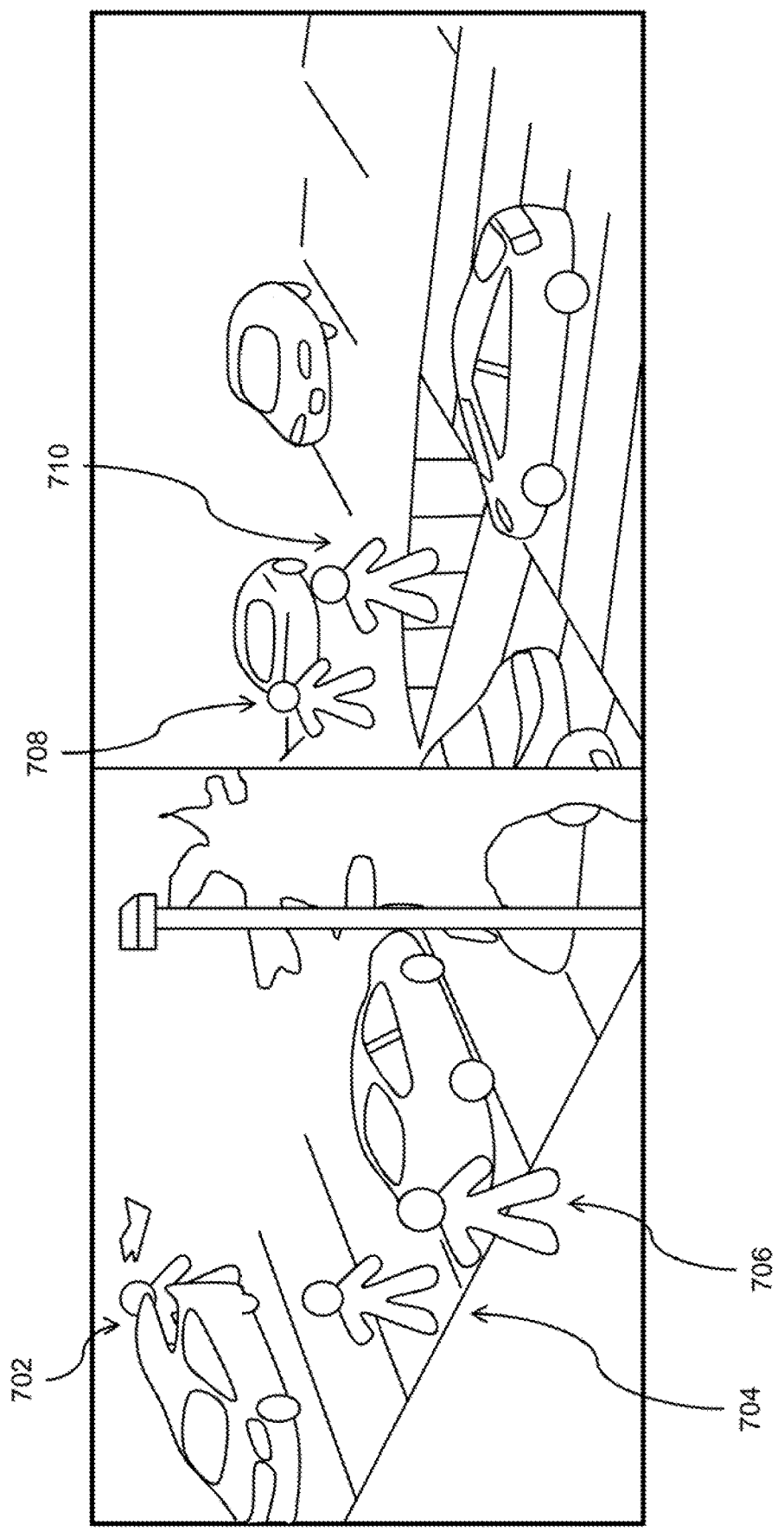
FIG. 7 includes illustrations of example images for open/close trunk activity classification, according to some embodiments.

FIG. 7 includes images 702, 704, and 706 representing a person next to an open trunk, a person between two vehicles, and a person near a closed trunk, respectively. FIG. 7 further includes images 708 and 710 representing a person next to a closed trunk and a person not next to a vehicle trunk, respectively.

Figure 8:
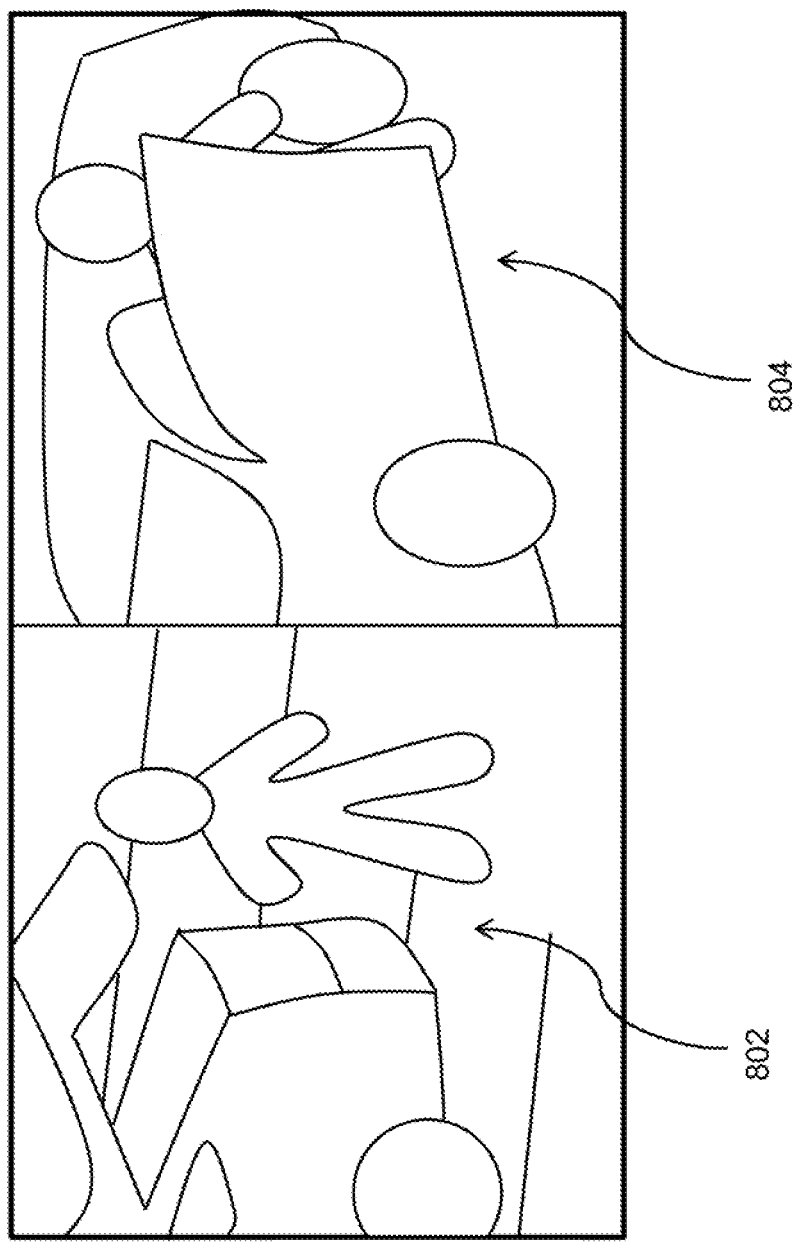
FIG. 8 includes illustrations of example images for open/close trunk activity and in/out vehicle classification, according to some embodiments.

FIG. 8 includes an image 802 of a person text to an open trunk, and an image 804 of a person getting in or out of a vehicle.

Ground-truthing was completed and the videos were annotated with bounding boxes and start/stop times. This resulted in 47 trunk open/close and 40 vehicle in/out sequences. The activity bounding boxes have resolution around 160×160 pixels. A classifier trained on features extracted by a CNN was used from the VIRAT dataset on 3 classes (open/close trunk, in/out vehicle, in/out building). 38/40 vehicle and 32/37 trunk activities were classified correctly with an overall 80.5% correct overall performance (see FIG. 9).

(4.7.2) Ground Platform

End-to-end test and evaluation has also been completed of an embodiment of a full activity recognition pipeline (e.g., object detection 304, tracks formation 306, CNN 308, RNN 310, activity classifier 312) on visible domain color videos from a moving ground vehicle. For some embodiments, additional or different modules may be used to constitute a full activity recognition pipeline.

Two evaluations were completed on this dataset. The first evaluation focused on activity classification with K=12 human activities. The CNN 308, RNN 310, and activity classifier 312 modules were evaluated on an 80/20 split of 427,000 activity clips. Since the humans in some of the videos are very far away, the evaluation focused on human activities where the number of vertical pixels on the target is more than 50 pixels. Global accuracy for 13-class activities=56.69%, as shown in FIG. 10.

Figure 11:
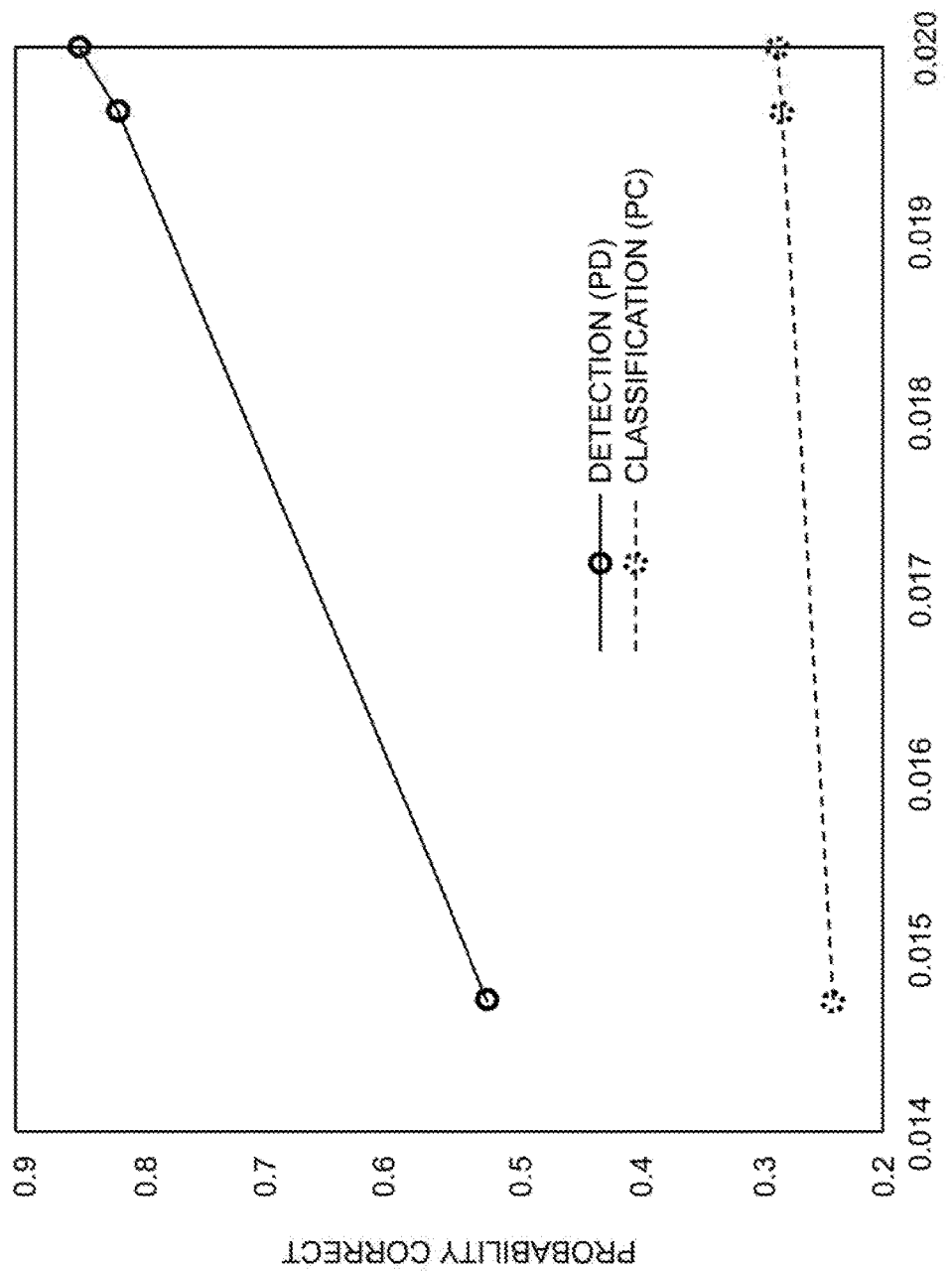
FIG. 11 is a graph illustrating results from testing of a full activity recognition pipeline, according to some embodiments.

The second evaluation completed evaluation of the full system with five integrated modules (object detection 304, tracks formation 306, CNN 308, RNN 310, activity classifier 312) on 30 videos, and results are shown in FIG. 11. These videos were sequestered and not used or seen during any training steps. The object detection module for this evaluation uses information from Literature Reference No. 8. Tracks were classified every 16 frames; and the most frequently occurring label for that track was then applied to all frames in that track. The output was compared against ground truth and ROC evaluations done (FIG. 6). These evaluations did not involve filtering by the number of pixels on a target (e.g., total pixels making up an object of interest). The results show an overall accuracy of 29% at FPPI<0.02. The chance accuracy for this dataset is 8%. For comparison, a human observer looking at these videos correctly recognized about 35% of these activities. The low accuracy was due to the relatively small size of human targets in the videos and confounding activities. For example, a person carrying a cell phone and water bottle look very similar from far away.

(4.8) Control of a Device

Figure 12:
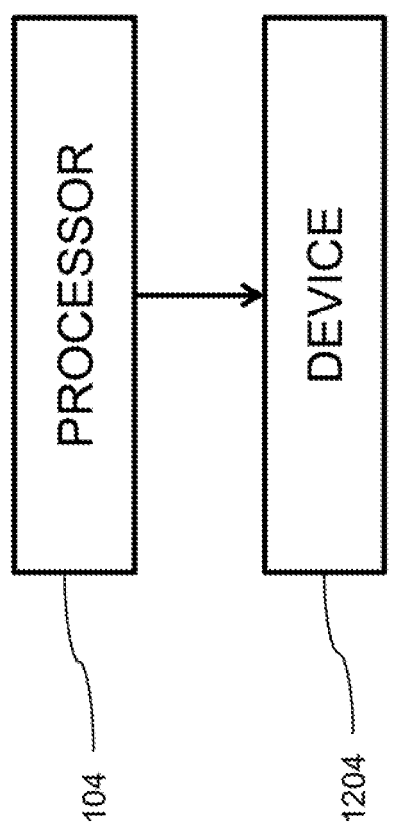
FIG. 12 is a block diagram depicting control of a device, according to various embodiments.

As shown in FIG. 12, a processor 104 may be used to control a device 1204 (e.g., a mobile device display, a virtual reality display, an augmented reality display, a computer monitor, a motor, a machine, a drone, a camera, etc.) based on an output of one or more of the modules described above. For example, the device 1204 may be controlled based on an activity classification determined by activity classifier 312.

The control of the device 1204 may be used to send at least one of a visual, audio, or electronic alert, such as regarding the activity classification of an object of interest (e.g., a pedestrian may be given an activity classification of moving into the path of a vehicle). For example, if an event of interest (e.g., an activity classification) occurs, a visual alert may be a warning light, a message provided on a display, or an image of the detected object. An audible alert may be a tone or other sound. An electronic alert may be an email, text message, or social media message.

In other embodiments, the device 1204 may be controlled to cause the device 1204 to move or otherwise initiate a physical action (e.g., a maneuver) based on the prediction. In some embodiments, an aerial or ground based vehicle (e.g., a drone) may be controlled to move and/or change movement, such as towards or away from an object of interest involved in an activity classification of interest. In other words, the device 1204 may be an actuator or motor that is used to cause a camera (or sensor) or other machine to move. In other embodiments, the device 1204 may be a camera or vehicle or other machine. In some additional embodiments, the device 1204 can receive or send alerts and/or tweets comprising an activity classification, time, and image or video to a user's cell phone or a central monitoring station. Example operations may include changing a field of view (e.g., orientation) of a camera to encompass or otherwise be directed towards the location where a classified activity was detected, which may allow the video image to be centered and/or zoomed in on an object of interest that is performing a classified activity of interest. Basic motor commands are known in the art, as are systems and algorithms for keeping or changing position, speed, acceleration, and orientation.

Figure 13:
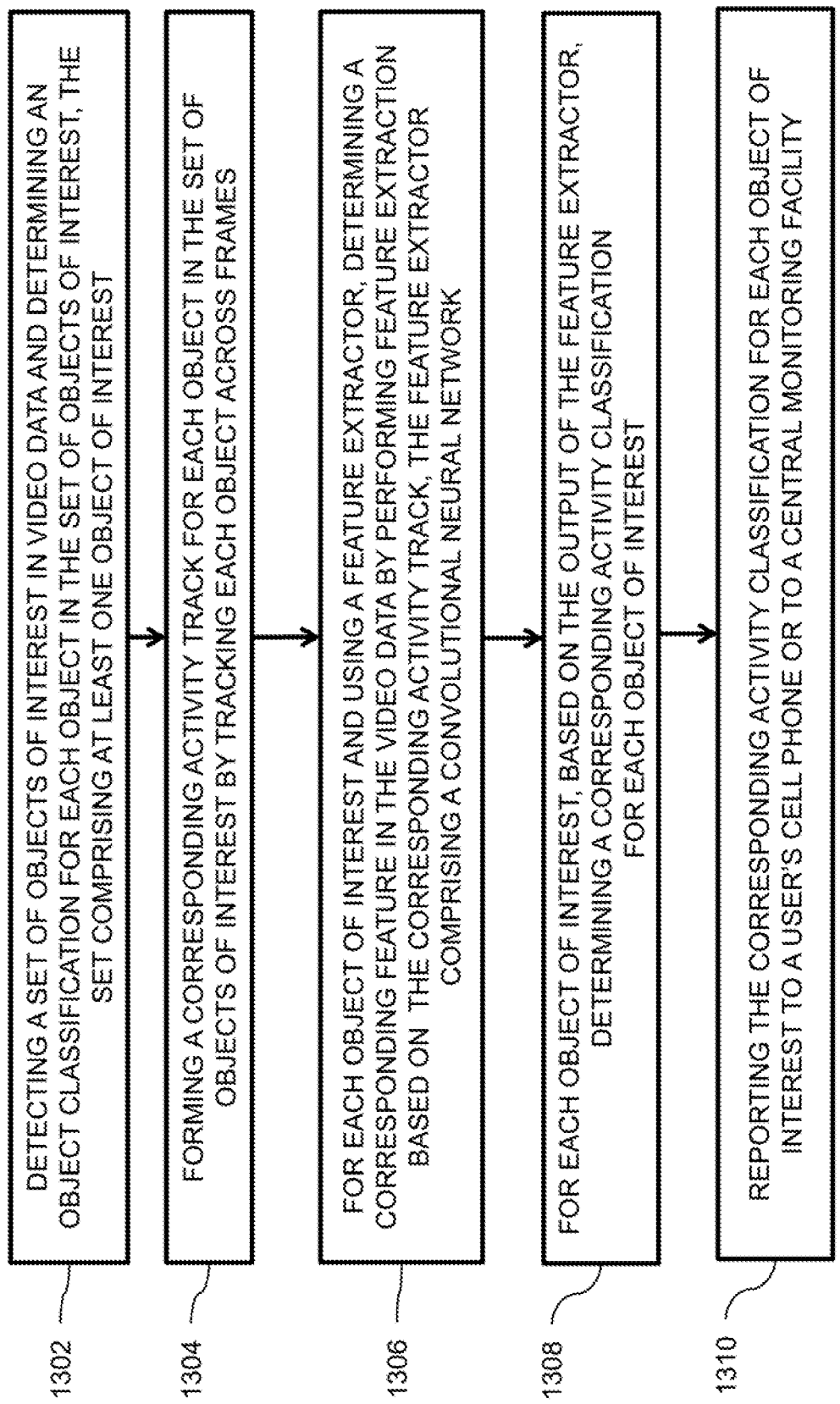
FIG. 13 a flowchart illustrating operations for predicting movement of an object, according to various embodiments.

FIG. 13 is a flowchart illustrating operations for predicting movement of one or more objects of interest, according to an embodiment. In operation 1302, a set of objects of interest in video data is detected and an object classification is determined for each object in the set of objects of interest, the set comprising at least one object of interest. In operation 1304, a corresponding activity track is formed for each object in the set of objects of interest by tracking each object across frames. In operation 1306, for each object of interest and using a feature extractor, a corresponding feature in the video data is determined by performing feature extraction based on the corresponding activity track, the feature extractor comprising a convolutional neural network. In operation 1308, for each object of interest, based on the output of the feature extractor, a corresponding activity classification is determined for each object of interest. In operation 1310, the corresponding activity classification for each object of interest is reported to a user's cell phone or to a central monitoring facility.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for visual activity recognition, the system comprising:
   one or more processors and a memory, the memory being a non-transitory computer-readable medium having executable instructions encoded thereon, such that upon execution of the instructions, the one or more processors perform operations of:
   detecting a set of objects of interest in video data and determining an object classification for each object in the set of objects of interest, the set comprising at least one object of interest;
   forming a corresponding activity track for each object in the set of objects of interest by tracking each object across a plurality of frames, wherein a filter is used to predict a centroid of each activity track in a current frame and update a moving bounding box such that each activity track is a sequence of moving bounding boxes across the plurality of frames, with the centroid representing movement of the object of interest across the plurality of frames in the video data and a size of each moving bounding box representing a size of the object of interest;
   for each object of interest and using a feature extractor comprising a convolutional neural network, determining a corresponding feature in the video data by performing feature extraction based on the corresponding activity track by independently processing each activity track with the convolutional neural network to determine the corresponding feature; and
   for each object of interest, based on the output of the feature extractor, determining a corresponding activity classification for each object of interest.

2. The system of claim 1, wherein the one or more processors further perform operations of:
   controlling a device based on at least one of the corresponding activity classifications.

3. The system of claim 2, wherein controlling the device comprises using a machine to send at least one of a visual, audio, or electronic alert regarding the activity classification.

4. The system of claim 2, wherein controlling the device comprises causing a ground-based or aerial vehicle to initiate a physical action.

5. The system of claim 1, wherein the feature extractor further comprises a recurrent neural network, and the one or more processors further perform operations of:
   for each object of interest and using the recurrent neural network, extracting a corresponding temporal sequence feature based on at least one of the corresponding activity track and the corresponding feature.

6. The system of claim 5, wherein the recurrent neural network uses Long Short-Term Memory as a temporal component.

7. The system of claim 1, wherein the convolutional neural network comprises at least five layers of convolution-rectification-pooling.

8. The system of claim 1, wherein the convolutional neural network further comprises at least two fully-connected layers.

9. The system of claim 1, wherein the activity classification comprises at least one of a probability and a confidence score.

10. The system of claim 5, wherein the set of objects of interest includes multiple objects of interest, and the convolutional neural network, the recurrent neural network, and the activity classifier operate in parallel on multiple corresponding activity tracks.

11. The system of claim 1, wherein the activity classification comprises at least one of a probability and a confidence score.

12. The system of claim 1, wherein the one or more processors further perform operations of:
reporting the corresponding activity classification for each object of interest to a user's cell phone or to a central monitoring facility.

13. A computer program product for biofeedback, the computer program product comprising:
a non-transitory computer-readable medium having executable instructions encoded thereon, such that upon execution of the instructions by one or more processors, the one or more processors perform operations of:
detecting a set of objects of interest in video data and determining an object classification for each object in the set of objects of interest, the set comprising at least one object of interest;
forming a corresponding activity track for each object in the set of objects of interest by tracking each object across a plurality of frames, wherein a filter is used to predict a centroid of each activity track in a current frame and update a moving bounding box such that each activity track is a sequence of moving bounding boxes across the plurality of frames, with the centroid representing movement of the object of interest across the plurality of frames in the video data and a size of each moving bounding box representing a size of the object of interest;
for each object of interest and using a feature extractor comprising a convolutional neural network, determining a corresponding feature in the video data by performing feature extraction based on the corresponding activity track by independently processing each activity track with the convolutional neural network to determine the corresponding feature; and
for each object of interest, based on the output of the feature extractor, determining a corresponding activity classification for each object of interest.

14. The computer program product of claim 13, wherein the one or more processors further perform operations of:
controlling a device based on at least one of the corresponding activity classifications.

15. The computer program product of claim 14, wherein controlling the device comprises using a machine to send at least one of a visual, audio, or electronic alert regarding the activity classification.

16. The computer program product of claim 14, wherein controlling the device comprises causing a ground-based or aerial vehicle to initiate a physical action.

17. The computer program product of claim 13, wherein the feature extractor further comprises a recurrent neural network, and the one or more processors further perform operations of:
for each object of interest and using the recurrent neural network, extracting a corresponding temporal sequence feature based on at least one of the corresponding activity track and the corresponding feature.

18. The computer program product of claim 16, wherein the recurrent neural network uses Long Short-Term Memory as a temporal component.

19. A computer implemented method for biofeedback, the method comprising an act of:
causing one or more processors to execute instructions encoded on a non-transitory computer-readable medium, such that upon execution, the one or more processors perform operations of:
detecting a set of objects of interest in video data and determining an object classification for each object in the set of objects of interest, the set comprising at least one object of interest;
forming a corresponding activity track for each object in the set of objects of interest by tracking each object across a plurality of frames, wherein a filter is used to predict a centroid of each activity track in a current frame and update a moving bounding box such that each activity track is a sequence of moving bounding boxes across the plurality of frames, with the centroid representing movement of the object of interest across the plurality of frames in the video data and a size of each moving bounding box representing a size of the object of interest;
for each object of interest and using a feature extractor comprising a convolutional neural network, determining a corresponding feature in the video data by performing feature extraction based on the corresponding activity track by independently processing each activity track with the convolutional neural network to determine the corresponding feature; and
for each object of interest, based on the output of the feature extractor, determining a corresponding activity classification for each object of interest.

20. The method of claim 19, wherein the one or more processors further perform operations of:
controlling a device based on at least one of the corresponding activity classifications.

21. The method of claim 20, wherein controlling the device comprises using a machine to send at least one of a visual, audio, or electronic alert regarding the activity classification.

22. The method of claim 20, wherein controlling the device comprises causing a ground-based or aerial vehicle to initiate a physical action.

23. The method of claim 19, wherein the feature extractor further comprises a recurrent neural network, and the one or more processors further perform operations of:
for each object of interest and using the recurrent neural network, extracting a corresponding temporal sequence feature based on at least one of the corresponding activity track and the corresponding feature.

24. The method of claim 23, wherein the recurrent neural network uses Long Short-Term Memory as a temporal component.

25. The system as set forth in claim 5, wherein the recurrent neural network concatenates features from multiple frames.

* * * * *